United States Patent [19]

Derleth et al.

[11] Patent Number: 5,726,260
[45] Date of Patent: Mar. 10, 1998

[54] PROCESS FOR THE PRODUCTION OF A MICROSPHEROIDAL POWDER OF LOW DISPERSITY, MICROSPHEROIDAL POWDER OF LOW DISPERSITY THUS OBTAINED, CATALYSTS FOR THE POLYMERIZATION OF ALPHA-OLEFINS AND PROCESS FOR THE POLYMERIZATION OF ALPHA-OLEFINS

[75] Inventors: Helmut Derleth, Nienburg, Germany; Abel Grosjean, Brussels, Belgium

[73] Assignee: Solvay (Société Anonyme), Brussels, Belgium

[21] Appl. No.: 478,367

[22] Filed: Jun. 7, 1995

Related U.S. Application Data

[62] Division of Ser. No. 27,521, Mar. 8, 1993.

[30] Foreign Application Priority Data

Mar. 10, 1992 [BE] Belgium ................ 09200248

[51] Int. Cl.$^6$ ........................ C08F 4/24
[52] U.S. Cl. .................. 526/106; 526/908
[58] Field of Search ............... 526/106, 908

[56] References Cited

U.S. PATENT DOCUMENTS

| | | | |
|---|---|---|---|
| 1,506,118 | 8/1924 | Govers | 423/335 |
| 3,960,826 | 6/1976 | Aboutboul et al. | 526/106 |
| 3,974,101 | 8/1976 | Witt | 502/237 |
| 4,037,042 | 7/1977 | Mueller-Tamm et al. | 526/106 |
| 4,053,436 | 10/1977 | Hogan et al. | 502/236 |
| 4,076,923 | 2/1978 | Matsuura et al. | 526/97 |
| 4,119,569 | 10/1978 | Dietz | 526/106 |
| 4,152,503 | 5/1979 | Short et al. | 526/106 |
| 4,169,926 | 10/1979 | McDaniel | 526/106 |
| 4,228,260 | 10/1980 | Scholten et al. | 502/330 |
| 4,382,022 | 5/1983 | McDaniel | 502/236 |
| 5,028,360 | 7/1991 | Ito et al. | 264/12 |

FOREIGN PATENT DOCUMENTS

| | | |
|---|---|---|
| 0 429 937 | 6/1991 | European Pat. Off. . |
| 1 077 908 | 8/1967 | United Kingdom . |
| 0 137 934 | 3/1989 | United Kingdom . |

OTHER PUBLICATIONS

Herdan, G., "An Account of Statistical Methods for the Investigation of Finely Divided Materials," *Small Particle Statistics*, Elsevier Publishing Company, New York, pp. 10 to 17 (1953).

*Primary Examiner*—Thomas R. Weber
*Attorney, Agent, or Firm*—Spencer & Frank

[57] ABSTRACT

Process for the production of a microspheroidal powder of low dispersity, according to which a hydrogel is prepared, an aqueous suspension of the ground hydrogel is subjected to atomisation in a stream of gas, gelled particles containing moisture are collected from the atomisation, the particles are brought into contact with an organic liquid in order to remove at least some of the moisture and the particles are then subjected to drying. The process applies to the production of silica powders intended to serve as support for chromium oxide catalysts which may contain titanium oxide and are suitable for the polymerisation of ethylene.

4 Claims, No Drawings

PROCESS FOR THE PRODUCTION OF A MICROSPHEROIDAL POWDER OF LOW DISPERSITY, MICROSPHEROIDAL POWDER OF LOW DISPERSITY THUS OBTAINED, CATALYSTS FOR THE POLYMERIZATION OF ALPHA-OLEFINS AND PROCESS FOR THE POLYMERIZATION OF ALPHA-OLEFINS

This is a Division of application Ser. No. 08/027,521 filed Mar. 8, 1993.

FIELD OF THE INVENTION

The present invention relates to a process for the production of a microspheroidal powder of low dispersity, in particular a silica powder optionally doped with metal compounds, typically titanium oxide. It relates in particular to a process for the production of such powders intended to serve as support for a chromium oxide catalyst for the polymerisation of alpha-olefins.

TECHNOLOGY REVIEW

In GB Patent 1,077,908 (Grace & Co) a process is described for the preparation of microspheroidal silica, according to which process a silica hydrogel is prepared, the hydrogel is subjected to atomisation, the particles collected from the atomisation are washed with a solution of sulphuric acid and then with water, and the washed product is then dried at a temperature higher than 200° C.

In U.S. Pat. No. 4,053,436 (Phillips Petroleum Company), a process is described for the production of a microspheroidal powder comprising silica, titanium dioxide and chromium oxide, according to which process sodium silicate and a solution of titanyl sulphate in sulphuric acid are mixed so as to obtain a cohydrogel of silica and titanium oxide, a suspension of the cohydrogel is subjected to atomisation in the presence of air so as to obtain a xerogel, the xerogel is impregnated with an aqueous solution of chromium trioxide and the particles collected from the impregnation are dried.

When the powders obtained by means of these known processes are used as catalyst supports for the polymerisation of alpha-olefins, the polymers obtained generally have a melt index which is too low for the production of mouldings. Furthermore, the use of a cogelling technique as described in U.S. Pat. No. 4,053,436 leads to the production of a catalyst having an excessively high specific surface, which has the adverse effect of slowing down the rate of polymerisation.

In order to increase the melt index of the polymers, it has been suggested, in Patent U.S. Pat. No. 4,037,042 (BASF), to prepare a spheroidal silica powder by mixing sulphuric acid and sodium silicate, subjecting the hydrosol thus obtained to spraying in the form of drops which then solidify as hydrogel beads and, by subjecting the hydrogel beads successively to washing with water, to a treatment with ethanol and to drying. This known process has a high risk of blocking the spray orifice in the case when premature gelling of the hydrosol may take place before or during spraying.

SUMMARY OF THE INVENTION

The invention overcomes the disadvantages of the known processes described above by providing a process which makes it possible easily to obtain a microspheroidal powder of low dispersity, having a specific surface which renders it compatible with the production of catalysts of high activity for the polymerisation of alpha-olefins, the polymers obtained having a high melt index.

DETAILED DESCRIPTION OF THE INVENTION

Consequently, the invention relates to a process for the production of a microspheroidal powder of low dispersity, according to which process a hydrogel is prepared, a suspension of the hydrogel is subjected to atomisation in a stream of gas, gelled particles from the atomisation are collected and these particles are subjected to drying; according to the invention, an aqueous suspension of the hydrogel in the ground state is used, atomisation is controlled in such a way that the particles collected from the latter contain moisture and, before drying, the particles are brought into contact with at least one organic liquid in order to remove at least some of the moisture.

In the process according to the invention, the microspheroidal powder of low dispersity is a powder of substantially spherical particles, the particle size distribution of which is defined by a mean diameter of less than 250 µm, preferably of less than 150 µm, and a standard deviation of less than 100 µm, preferably not exceeding 50 µm, the mesh diameter $D_m$ and the standard deviation $\sigma$ being defined by the following relationships (G. Herdan "Small particle statistics", 1953, Elsevier, pages 10–17):

$$D_m = \frac{\Sigma n_i D_i}{\Sigma n_i} \text{ and } \sigma = \sqrt{\frac{\Sigma n_i (D_i - D_m)^2}{\Sigma n_i}}$$

where $n_i$ denotes the frequency by weight of the particles of diameter $D_i$.

In the process according to the invention, the hydrogel may be obtained by any suitable known means, for example by reaction of a gellable compound with an acidic or alkaline compound. Examples of gellable compounds are silicon derivatives capable of gelling under the effect of a liquid or gaseous acidic or alkaline compound. Silicon derivatives capable of gelling which may be mentioned are alkali metal and ammonium silicates, as well as tetraalkoxysilanes, in particular tetramethoxysilane and tetraethoxysilane. The acidic or alkaline compound used for gelling may be selected from inorganic oxyacids (for example sulphuric acid and carbon dioxide), inorganic hydracids (for example hydrogen chloride), carboxylic acids (for example acetic acid), ammonia and aliphatic, alicyclic or aromatic amines.

In the process according to the invention, the aqueous suspension of the hydrogel in the ground state is subjected to atomisation. The suspension may be obtained by grinding the hydrogel in the presence of water. Preferably, the hydrogel is ground and water is then added thereto. Grinding of the hydrogel is intended to fragment it to the particulate state. Advantageously, grinding is controlled so as to obtain particles with a diameter of less than 50 µm, for example of between 5 and 40 µm, values of between 10 and 30 µm being preferred. The quantity of water added to the ground hydrogel is controlled so as to obtain a homogeneous suspension sufficiently fluid for atomisation. It is recommended that the quantity of water added is equal to at least 5% (preferably 10%) of the weight of the hydrogel. In practice, there is no value in using a quantity of water greater than 50% of the weight of the hydrogel, quantities of between 10 and 20% being recommended.

Before grinding, the hydrogel may be subjected to aging which, depending on the composition of the hydrogel, may vary from 30 minutes to several hours, at a temperature varying from 10° to 150° C.

Atomisation may be produced by spraying the suspension of ground hydrogel through an orifice of small size. According to the invention, atomisation is carried out in a stream of gas under conditions controlled to prevent complete drying. In general, the atomisation is controlled in such a way that the particles collected from the latter have a moisture content of more than 50% of their weight, for example of between 60 and 80%. The atomisation is carried out in a stream of gas, the temperature of which must be higher than 100° C. For example, temperatures of between 200° and 600° C. (preferably 350° and 450° C.) at the entry of the atomisation orifice and of between 50° and 200° C. (preferably of between 100° and 124° C.) at the end of atomisation are recommended. The stream of gas must be chosen so that it is inert with respect to the hydrogel. For example, it may be air. It is possible to operate under reduced pressure, atmospheric pressure or higher than atmospheric pressure, as desired. The suspension of ground hydrogel may be introduced into the gas at ambient temperature (between 15° and 25° C.), the atomised particles usually being at the same temperature as the gas at the end of atomisation.

According to the invention, drying of the particles collected from the atomisation is continued by bringing said particles into contact with an organic liquid. The particles may, for example, be brought into contact with the organic liquid by dispersing them in the liquid. The organic liquid chosen must be at least partially miscible with water and inert with respect to the particles. Organic liquids which can be used in the process according to the invention are alcohols, ethers or mixtures thereof. Alkanols are preferred, particularly those comprising from 1 to 4 carbon atoms. Isopropanol is suitable. The treatment with the organic liquid is generally controlled in such a way that the moisture content of the particles collected from this treatment does not exceed 20% of their weight, preferably 10%. In practice, on economic grounds, there is no advantage in going below a moisture content of 0.1% by weight, values of between 0.5 and 5% being preferred. Information regarding the treatment with the organic liquid is available in U.S. Pat. No. 3,974,101 (Phillips Petroleum). It is, of course, possible to carry out several successive treatments with the organic liquid.

At the end of the treatment with the organic liquid, the particles are subjected to drying in order to remove the final traces of moisture therefrom. Drying may be carried out in air, at ambient temperature, for example in a fluidised bed.

The process according to the invention is characterised by an original combination of a grinding of the hydrogel subjected to the atomisation, an atomisation of the suspension of ground hydrogel under specific conditions (controlled so as to obtain moist particles) and a two-step drying (comprising a treatment with at least one organic liquid). The aim of this original combination is to preserve the internal structure of the particles collected from the atomisation and to prevent collapse of the pores in said particles in a subsequent process for the production of a polymerisation catalyst.

The process according to the invention applies, in particular, to the production of powders of oxides of elements of groups III and IV of the Periodic Table, such as yttrium, zirconium, aluminium and silicon, silicon being particularly preferred.

In the particular case where the invention is applied to the production of a silica powder, the hydrogel may be obtained by reaction of an aqueous solution of alkali metal silicate or ammonium silicate with an acidic compound, for example sulphuric acid. The reaction is frequently carried out with an aqueous solution of alkali metal silicate. In this application of the invention, the particles collected from the atomisation are treated in order to remove the alkali metal. To this end, it is possible, for example, to wash the particles with an aqueous solution of sulphuric acid, ammonium sulphate or ammonium nitrate, as described in the documents GB-1,077,908 and U.S. Pat. No. 4,053,436. Washing is preferably carried out so as to reduce the residual alkali metal content of the particles to below 1% by weight, preferably to below 0.1%.

As a variant, the removal of the alkali metal may be carried out by treating the hydrogel before atomisation, before or after grinding.

In an advantageous variant of this application of the invention, a metal oxide is dispersed in the solution of alkali metal silicate before the reaction with the acidic compound, in such a way that the pH of the hydrogel is greater than 6, for example between 6.5 and 7.5, values close to 7 being preferred. In this variant of the invention, the metal oxide is used in the pulverulent state, advantageously characterised by a mean particle diameter not exceeding 25 μm, for example of from 1 to 10 μm (preferably of from 5 to 7 μm).

In another variant of the invention, the pulverulent metal oxide is added to the hydrogel, before or after grinding of the latter.

This variant of the invention is particularly suitable for the production of powders of silicon and titanium oxides which can be used as catalyst supports for the polymerisation of alpha-olefins. All other things being equal, the catalysts thus obtained prove more active than those obtained by cogelling silicon and titanium oxides.

The process according to the invention makes it possible to obtain microspheroidal powders of low dispersity having a mean diameter not exceeding 250 μm (generally at least 20 μm) and a standard deviation not exceeding 100 μm. By means of appropriate choice of the operating conditions, it makes it possible, in particular, to obtain powders characterised by a mean diameter of between 50 and 150 μm and a standard deviation of less than 70 μm, for example of between 10 and 60 μm.

The process according to the invention also makes it possible to obtain powders which have a specific surface not exceeding 700 $m^2/g$, generally 550 $m^2/g$, without being less than 200$m^2/g$, generally 300 $m^2/g$, and which have a pore volume of between 1 and 3 $cm^3/g$, preferably of between 1.2 and 2.5 $cm^3/g$, more particularly of between 1.8 and 2.2 $cm^3/g$. The process makes it possible to obtain powders in which the particles have a shape close to that of a sphere, this shape being characterised by a roundness factor defined by the relationship $P^2/(4\pi*S)$ where:

P denotes the perimeter of the image of the particle observed under the microscope, and S denotes the area of this image.

The invention accordingly also relates to microspheroidal powders of low dispersity obtained by the process described above and having one or more of the characteristics explained above.

The powders obtained by the process according to the invention have the advantageous characteristic of possessing a specific surface compatible with use as catalyst support for the polymerisation of alpha-olefins, the catalyst advantageously consisting of chromium oxide.

The invention accordingly also relates to catalysts for the polymerisation of alpha-olefins containing chromium on a microspheroidal powder of low dispersity obtained by means of the process described above.

The catalyst according to the invention may be obtained in a manner known per se by impregnating the powder with an aqueous or organic solution of a chromium compound, followed by drying in an oxidising atmosphere. To this end, it is possible to use a chromium compound preferably chosen from the soluble salts, such as the oxides, the acetate, the chloride, the sulphate, the chromate and the bichromate, in aqueous solution, or such as the acetylacetonate in organic solution. The catalyst may also be obtained by means of mechanical mixing of the support powder with a solid chromium compound, for example chromium acetylacetonate.

As a variant, the chromium compound may also be incorporated in the support powder during the production of the latter. To this end it may, for example, be added, in part or in its entirety, to the hydrogel before or after grinding of the latter or to the particles resulting from the atomisation.

Chromium is generally present in the catalyst according to the invention in a proportion varying from 0.05 to 10% by weight, preferably from 0.1 to 5% and more particularly from 0.25 to 2% by weight of chromium, based on the total weight of the catalyst. When the catalyst contains titanium, the content of the latter generally varies from 0.1 to 10% by weight, preferably from 0.5 to 7.5% by weight and more particularly from 1 to 4% by weight, with respect to the total weight of the catalyst.

The catalysts according to the invention may be used for the polymerisation of alpha-olefins containing from 2 to 8 carbon atoms per molecule and in particular for the production of ethylene homopolymers or copolymers of ethylene with one or more comonomers selected from the alpha-olefins described above. Preferably, these comonomers are propylene, 1-butene, 1-pentene, 3-methyl-1-butene, 1-hexene, 3- and 4-methyl-1-pentenes and 1-octene. Diolefins comprising from 4 to 18 carbon atoms may also be copolymerised with ethylene. Preferably, the diolefins are unconjugated aliphatic diolefins such as 4-vinylcyclohexene or alicyclic diolefins having an endo-cyclic bridge such as dicyclopentadiene, methylenenorbornene and ethylidenenorbornene, and conjugated aliphatic diolefins such as 1,3-butadiene, isoprene and 1,3-pentadiene.

The catalysts according to the invention are particularly suitable for the production of ethylene homopolymers and copolymers containing at least 90% and preferably at least 95% by weight of ethylene. The preferred comonomers are propylene, 1-butene, 1-hexene or 1-octene.

The invention accordingly also relates to a process for the polymerisation of alpha-olefins as defined above, using a catalyst according to the invention. In the process according to the invention, the polymerisation may be carried out in solution, in suspension in a hydrocarbon diluent or in the gas phase, as desired.

The catalysts according to the invention find particularly valuable use in suspension polymerisations for the production of polymers having a wide range of variation in melt indices and molecular mass distributions, these two parameters being controllable by the methods well known in the art, such as the polymerisation conditions, the conditions for activation of the support, its morphology, and the like.

Suspension polymerisation is carried out in a hydrocarbon diluent, such as liquid aliphatic, cycloaliphatic and aromatic hydrocarbons, at a temperature such that the polymer formed is insoluble therein. The preferred diluents are linead alkanes, such as n-butane, n-hexane and n-heptane, or branched alkanes, such as isobutane, isopentane, isooctane and 2,2-dimethylpropane, or cycloalkanes, such as cyclopentane and cyclohexane or mixtures thereof.

The polymerisation temperature is generally chosen between 20° and 200° C., preferably between 50° and 150° C. and in particular between 80° and 115° C. The ethylene pressure is most frequently chosen between atmospheric pressure and 5 MPa, preferably between 0.4 and 2 MPa and more particularly between 0.6 and 1.5 MPa.

The polymerisation may be carried out continuously or noncontinuously.

EXAMPLES

The examples which are described below serve to illustrate the invention. In these examples, catalysts have been prepared which have then been used to polymerise ethylene.

The meaning of the symbols used in these examples, the units expressing the quantities mentioned and the methods for measuring these quantities are explained below.

The supports were observed under an optical microscope and the result of this observation was treated by image analysis via a Kontron analyser of the Ibas 2000 type.

$D_m$=mean equivalent diameter of the powders in µm (the equivalent diameter is that of a sphere having a surface area equal to the surface area of the particle observed. Approximately 300 particles were analysed in order to define the average diameter).

$\sigma$=standard deviation expressed in µm.

$\alpha$=catalyst activity conventionally expressed as grams of insoluble polymer obtained per hour and per gram of catalyst and divided by the molar fraction of ethylene in the diluent.

fRo=roundness factor of the particles.

HLMI=melt index expressed in the melt, measured under a load of 21.6 kg at 190° C. and expressed in g/10 min in accordance with ASTM standard D 1238.

Ss=specific surface of the catalyst solid expressed in $m^2/g$ (British Standard BS 4359/1). This measurement is carried out after preparation of the catalyst.

Example 1 (according to the invention)

A. Preparation of the catalyst support

An aqueous solution of sodium silicate (containing 18% by weight of silica) was prepared in which pulverulent titanium dioxide (mean diameter of between 0.1 and 10 µm) was dispersed. The quantity of titanium oxide used was controlled so as to obtain a titanium content of 1.5% by weight in the catalyst support.

The sodium silicate solution was treated with an aqueous solution of sulphuric acid (containing 96% by weight of sulphuric acid) in a quantity controlled so as to obtain a pH of about 6.9 during gelling. The operating temperature was fixed at 25° C.

A hydrogel was collected from the mixture and was subjected to aging for 4 h at 20° C.

At the end of aging, the gel was treated in a colloid mill made by Alpine. A ground hydrogel in the form of 10 to 30 µm particles was collected from the mill and about 10% of water was added to this ground hydrogel.

The ground hydrogel was then atomised by passing through a spray orifice 1 mm in diameter inside a chamber through which a stream of air flowed. The air flow rate was controlled in such a way that the temperature of the air fell from 400° C. at the inlet of the chamber to 110° C. at the outlet of the latter. Approximately spherical particles were collected from the atomisation. During atomisation, the particles of hydrogel were subjected to partial drying. The particles collected from the atomisation then had a residual moisture content of 70 to 72% by weight.

The particles collected from the atomisation were then treated with a solution of ammonium sulphate in order to reduce their sodium content to below 300 ppm with respect to the weight of the dry product. The particles were then subjected to washing with water for 30 h.

The particles collected from the washing were then treated with isopropanol in order to extract the impregnating water. The treatment comprised dispersing the particles in isopropanol at 30° C. and subjecting them to moderate agitation by blowing in air. Five successive treatments were carried out. The treatment was continued until the residual water content had fallen to between 2 and 3% of the weight of the particles.

The particles were then subjected to drying at 200° C. for 12 h. A silica and titanium oxide powder according to the invention was collected from the drying. The powder had the following characteristics:

$D_m=138$ $\sigma=31$ $fRo=1.2\pm0.2$

B. Catalyst prepared from the powder obtained according to A

A catalyst precursor was first prepared by mixing the powder obtained under A with chromium acetylacetonate in a proportion controlled in such a way that the mixture contained 10 g of chromium per kg.

The mixture was then treated with hot air at 200° C. for 18 h in a fluidised bed reactor.

The precursor thus obtained was introduced into a quartz tubular reactor 33 mm in diameter in which dry air was circulated at a flow rate of 12 liters STP per hour. This apparatus was placed in an electric furnace and heated up to 600° C. in the course of one hour. The catalyst was kept at this temperature for a further 15 h and then brought back to ambient temperature. The catalyst had the following characteristic:

$Ss=416$

C. Polymerisation of ethylene 1 liter of isobutane was introduced into a predried 3-liter autoclave provided with a stirrer and the temperature was then raised to 105° C. before establishing an ethylene pressure of 1.29 MPa therein and introducing 100 mg of catalyst. The reactor was kept under these conditions for the time necessary for the production of 350 g of polyethylene. After degassing, the compolymer was collected. The following results were obtained:

$\alpha=45,000$ $HLMI=11$

Example 2 (reference)

In this example a catalyst was produced using the technique of the prior art. To this end, in order to prepare the catalyst support, the operations of Example 1 (A) were repeated except that the pulverulent titanium dioxide of Example 1 was replaced by an equivalent quantity of titanyl sulphate which was added to the sulphuric acid solution.

The powder collected at the end of the process had the following characteristics:

$D_m=196$ $\sigma=55$ $fRo=1.2\pm0.2$

Using this powder as starting material, a catalyst was produced as described in Example 1 (B), with which catalyst the polymerisation of ethylene was carried out under the conditions specified in Example 1 (C).

The following results were obtained:

$Ss=800$ $\alpha=39,000$ $HLMI=3.8$.

Example 3 (according to the invention)

A. Preparation of the catalyst support

The operations of Example 1(A) were repeated with the exception of the following conditions:

the pH during gelling amounted to 7, the aging of the hydrogel lasted for 6 hours, during atomisation, the temperature of the air fell from 580° C. at the inlet of the chamber to 150° C. at the outlet of the latter, the treatment with a solution of ammonium sulphate in order to reduce the sodium content was carried out before grinding the hydrogel, instead of after the atomisation, the particles collected from the atomisation were subjected to ten successive treatments with isopropanol, without any washing with the drying of the particles was carried out at 150° C. for 18 h and was continued at 540° C. for 1 h.

B. Catalyst prepared from the powder obtained according to A

The operations of Example 1(B) were repeated except that the electric furnace was heated up to 150° C. for 2 h and then to 700° C. for 16 h.

C. Copolymerisation of ethylene with hexene 150 mg of catalyst and 1 liter of isobutane were introduced into a predried 3-liter autoclave provided with a stirrer and the temperature was then raised to 105° C. before establishing an ethylene pressure of 1 MPa therein and introducing 1.5 g of hexene. The reactor yes kept under these conditions for 48 minutes. After degassing, 231 g of copolymer were collected. The following results were obtained:

$\alpha=32,000$ $HLMI=108$

Example 4 (reference)

A. Preparation of the catalyst support

The operations of Example 3(A) were repeated except that the treatment of the particles collected from the atomisation with isopropanol was omitted, B. Catalyst prepared from the powder obtained according to A The operations of Example 3(B) were repeated.

C. Copolymerisation of ethylene with hexene

The operations of Example 3(C) were repeated. There hasn't been formed any polymer at all during the polymerisation time.

Comparison of the results of Example 4 with those obtained in Example 3 demonstrates the progress brought about by the invention regarding the activity of the catalyst.

What is claimed is:

1. In a process for the polymerisation of alpha-olefins, the improvement comprising a catalyst containing chromium on a microspheroidal powder consisting essentially of silicon oxide and titanium oxide, the titanium content ranging from 0.1 to 10% by weight with respect to the total weight of the catalyst, said microspheroidal powder of low dispersity having a mean diameter of between 20 and 250 µm and a standard deviation of less than 70 µm.

2. The process according to claim 1, applied to the polymerisation of ethylene.

3. The process according to claim 1, wherein the powder has a particle size distribution defined by a mean diameter of between 50 and 150 µm and a standard deviation of between 10 and 60 µm.

4. The process according to claim 1, wherein the powder has a specific surface area of between 200 and 700 $m^2/g$ and pore volume of between 1 and 3 $cm^3/g$.

* * * * *